United States Patent [19]

Ciavarella et al.

[11] Patent Number: 5,132,673
[45] Date of Patent: Jul. 21, 1992

[54] HAND HELD DIGITIZER

[75] Inventors: Peter Ciavarella; Bohdan M. Petryhyrycz, both of Calgary, Canada

[73] Assignee: Digi-Rule Inc., Calgary, Canada

[21] Appl. No.: 489,323

[22] Filed: Mar. 6, 1990

[51] Int. Cl.⁵ .............................................. G09G 3/02
[52] U.S. Cl. ................................. 340/710; 340/706; 178/18; 33/1 M
[58] Field of Search ............... 340/710, 709, 706, 712; 178/18, 19; 250/221; 33/1 M; 74/471 XY

[56] References Cited

U.S. PATENT DOCUMENTS

| | | |
|---|---|---|
| 2,110,878 | 11/1963 | Horeth et al. |
| 2,638,402 | 5/1953 | Lee. |
| 3,030,021 | 4/1962 | Ferre. |
| 3,046,553 | 7/1962 | Hawkins et al. |
| 3,259,733 | 7/1966 | Klaver et al. |
| 3,567,949 | 3/1971 | Forgotson. |
| 3,666,781 | 1/1975 | Alexander. |
| 3,918,028 | 11/1975 | Humphrey. |
| 4,070,743 | 6/1987 | Zemke ............... 178/18 |
| 4,553,035 | 11/1985 | Malinsky. |
| 4,561,183 | 12/1985 | Shores ............... 33/1 M |
| 4,566,191 | 1/1986 | Moseley ............... 33/1 M |
| 4,575,581 | 3/1986 | Langberg ............... 33/1 M |
| 4,709,483 | 12/1987 | Hembree et al. ....... 33/1 M |
| 4,712,101 | 12/1987 | Culver ............... 340/710 |
| 4,767,923 | 8/1988 | Yuasa ............... 340/710 |
| 4,785,357 | 11/1988 | Dreyfus et al. |
| 4,797,544 | 1/1989 | Montgomery. |
| 4,804,949 | 2/1989 | Faulkerson ............ 340/710 |

OTHER PUBLICATIONS

Brochure by Tamaya showing Planix 5000 Digitizing Area-Line Meter, undated but no later than Oct., 1989.

Primary Examiner—Alvin E. Oberley
Assistant Examiner—Xiao Min Wu
Attorney, Agent, or Firm—Anthony R. Lambert

[57] ABSTRACT

A digitizer for digitizing a trace on a two-dimensional surface, in which the surface is defined by a longitudinal Y direction and a transverse X direction. The digitizer includes a frame mounted on at least three wheels such that the frame is movable only along the Y direction, a cursor mounted on the frame such that the cursor moves in relation to the frame in the X direction; a rotary optical encoder for determining the direction and amount of movement of at least one of the wheels; a pair of linear optical encoders for determining the direction and amount of movement of the cursor; and electronic circuits, including a microcomputer unit, for receiving information from the optical encoders which is indicative of the X and Y position of the cursor and for transmitting data, serially, to a host computer. The information may then be displayed and processed on a host computer in accordance with known devices.

8 Claims, 8 Drawing Sheets

HAND HELD DIGITIZER

COPYRIGHT MATERIAL

A portion of the disclosure of this patent document contains material to which a claim of copyright protection is made. The copyright owner has no objection to the facsimile reproduction by anyone of the patent document or the patent disclosure, as it appears in the patent and trademark office patent file or records, but reserves all other rights whatsoever.

FIELD OF INVENTION

This invention relates to digitizers for converting continuous analog two-dimensional representations of data to digital signals.

BACKGROUND OF THE INVENTION

Ever since the implementation of computers in geological exploration, it has been desirable to digitize the large amounts of data that are available only in analog form, for example of a hand picked horizon on a seismic section. However, existing devices for carrying out the digitizing have been unsatisfactory. Thus, for example, the typical mouse used with personal computers is entirely inadequate for digitizing since it lacks precision.

Also, table top systems presently employed for digitizing use large, transparent grid systems and a hand-held cursor with an induction coil for creating a current in the wires of the grid. These digitizers are cumbersome and difficult to use.

In another digitizer used for digitizing seismic sections, an optical sensor slides along a steel bar having an optical strip to determine points in the Y direction along the steel bar. In the X direction (next shot point) the steel bar must be moved by hand to the next trace.

Recently, there has been produced a planimeter which utilizes a pair of wheels, each with a rotary optical encoder, oriented parallel to each other. The planimeter responds to the differential movement of the dual rotary optical encoders as the wheels follow a trace.

SUMMARY OF THE INVENTION

The inventors have developed a two dimensional digitizer that improves on prior art digitizers and may be described in one aspect as a digitizer for digitizing a trace on a two-dimensional surface, in which the surface is defined by a longitudinal Y direction and a transverse X direction, the digitizer comprising:

a frame movable over the surface;

means mounted on the frame for restraining the frame to move in the Y direction;

a cursor mounted on the frame and restrained to move in the X direction;

means mounted on the frame for detecting the position of the frame in the Y direction and for producing a first signal representative of the Y position of the frame;

means mounted on the frame or cursor for detecting the position of the cursor in the X direction and for producing a second signal representative of the X position of the cursor;

and processing means connected to the Y position detection means and the X position detection means for processing the first and second signals.

Other embodiments of the invention may be found in the claims of this patent.

BRIEF DESCRIPTION OF THE DRAWINGS

There will now be described a preferred embodiment of the invention, with reference to the figures by way of example, in which.

DETAILED DESCRIPTION OF A PREFERRED EMBODIMENT OF THE INVENTION

Figure 1:
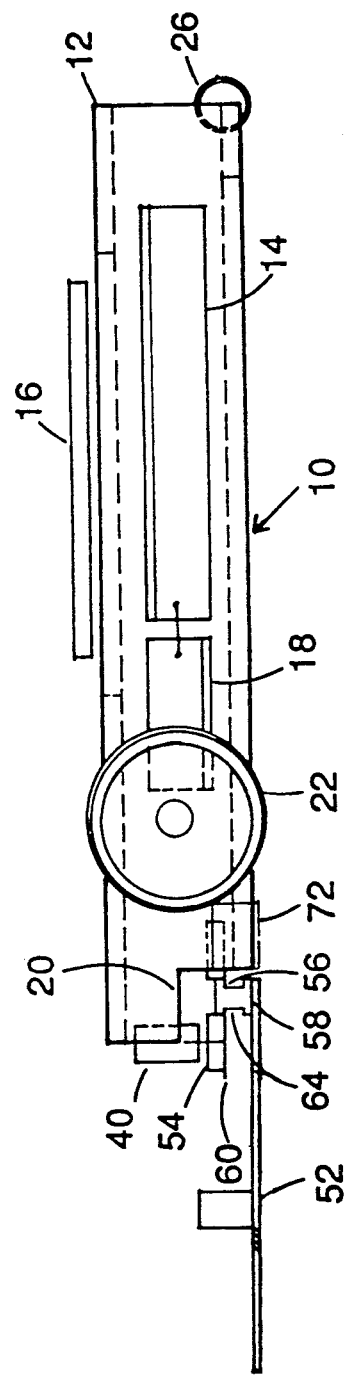
FIG. 1 is a side view schematic, partly broken away, of a digitizer according to the invention.
Figure 2:
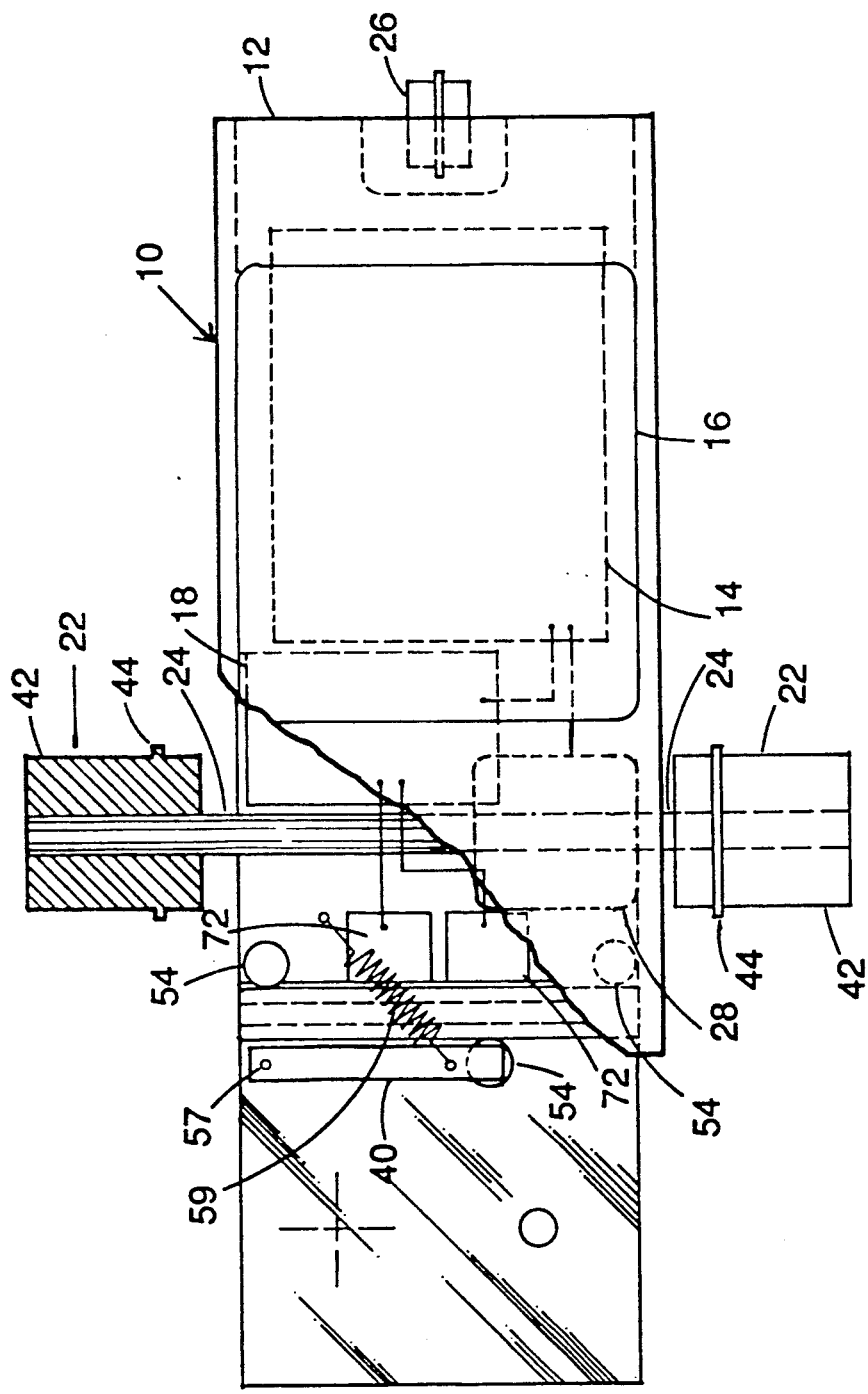
FIG. 2 is a top view schematic, partly broken away, of a digitizer according to the invention.
Figure 3:
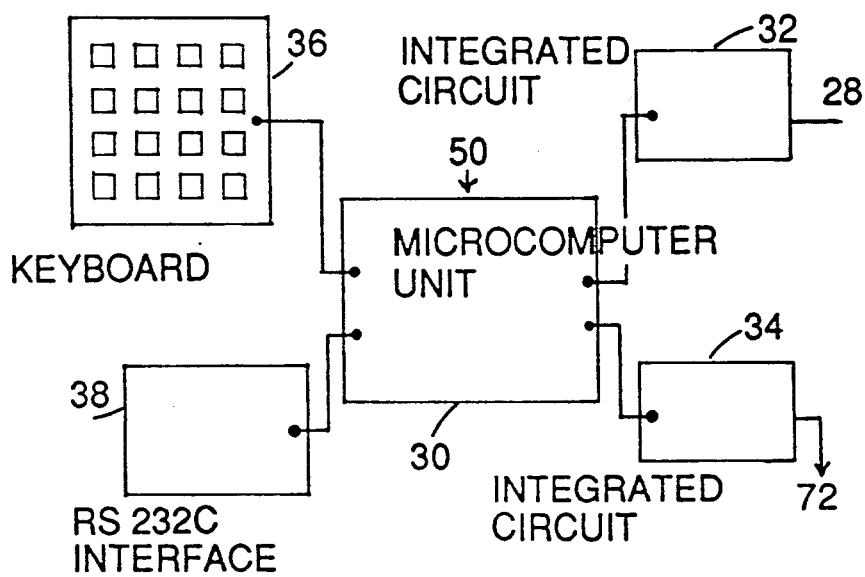
FIG. 3 is an electrical schematic of a digitizer according to the invention.

Referring to FIGS. 1, 2, and 3, digitizer 10 includes a frame 12 preferably made of one inch by three inch aluminum tubing. The frame 12 encloses an electronic circuit board 14 and amplifier 18. The electronic circuit board 14 houses the main electrical components of the digitizer 10, as described in more detail below. Keypad 16 is attached, by any of various conventional means, to the upper surface of the frame 12, such that it is readily accessible to a person operating the frame 12 with one hand.

Figure 4:
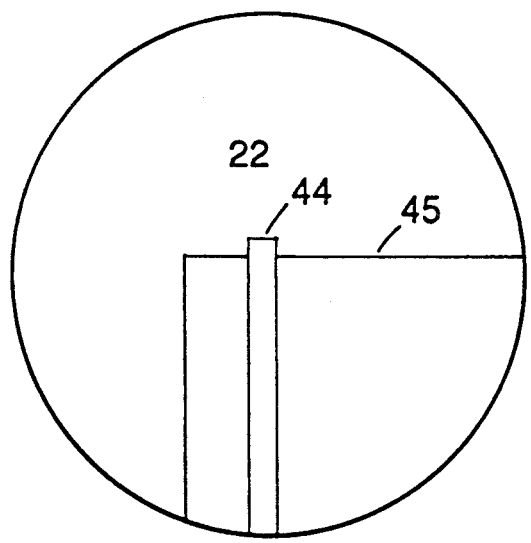
FIG. 4 shows a close-up detail of a gripping wheel for a digitizer according to the invention.

The digitizer 10 is restrained to move only in its longitudinal direction (defined in this patent for convenience as the Y direction) by two diamond grit wheels 22 mounted on a ¼" steel shaft 24. The steel shaft 24 may be mounted within the frame 12 by any of various conventional means. One of the diamond grit wheels 22 is shown in more detail in FIG. 4. Each wheel 22 includes a cylindrical wheel rim 42 with a secondary raised rim 44, about 1/16" wide. The raised rim 44 is coated with diamond grit on its circumference. The diamond grit (or equivalent grit) provides for excellent gripping on, for example, a paper surface. For ease of movement, the digitizer 10 is also provided with a rear wheel 26 mounted on an axle (not shown) at the rear of the frame 12. The rear wheel 26 may also be provided with a raised rim, and is also diamond coated.

The digitizer 10 is also provided with means for detecting the position of the digitizer 10 in the Y direction. In the preferred embodiment, the means for detecting the position of the frame in the Y direction includes a rotary optical encoder 28 (for example model no. HEDS 5000, readily commercially available) also mounted on the frame 12. The rotary optical encoder 28 receives the shaft 24 (the shaft 24 passes through the rotary optical encoder 28) and is responsive to the rotation of the wheel. The rotary optical encoder 28 sends a signal indicative of the amount of rotation of the wheel to integrated circuit 32 (on integrated circuit board 14) which keeps track of the position of the wheel (that is, how far the wheel has moved from an initial point in the Y direction and also which direction it has moved). The resolution in the Y direction is 0.0025 inches. The integrated circuit may be, for example, Item No. HCTL2016, which is readily commercially available. The HEDS 5000 rotary optical encoder houses its own amplifier.

While the frame 12 is constrained to move only in the Y direction, it is provided with a cursor 52 mounted on the front end of the frame 12 and the cursor 52 is restrained to move only in the X direction, perpendicular to the Y direction. The cursor 52 is preferably made of ¼" clear plexiglass, and, in the embodiment shown, is about 10" long in the X direction.

Figures 5A, 5B, 5C:
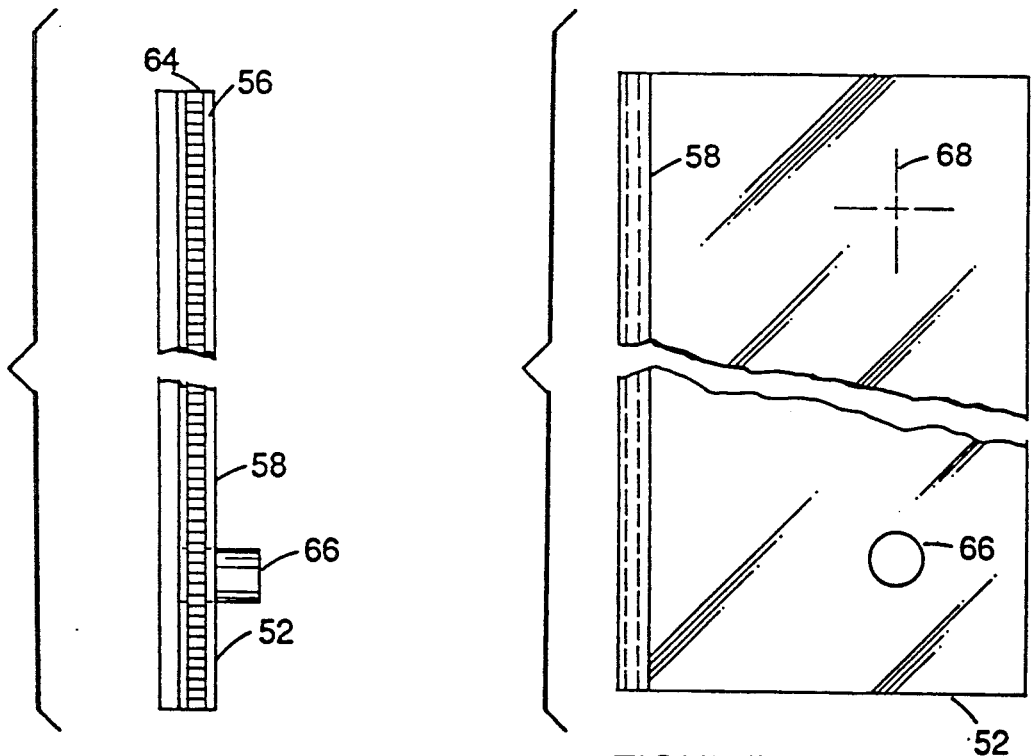
FIG. 5a is an end view schematic of a cursor for use with a digitizer according to the invention.
FIG. 5b is a side view schematic of a cursor for use with a digitizer according to the invention.
FIG. 5c is a top view schematic of a cursor for use with a digitizer according to the invention.
Figure 6A:
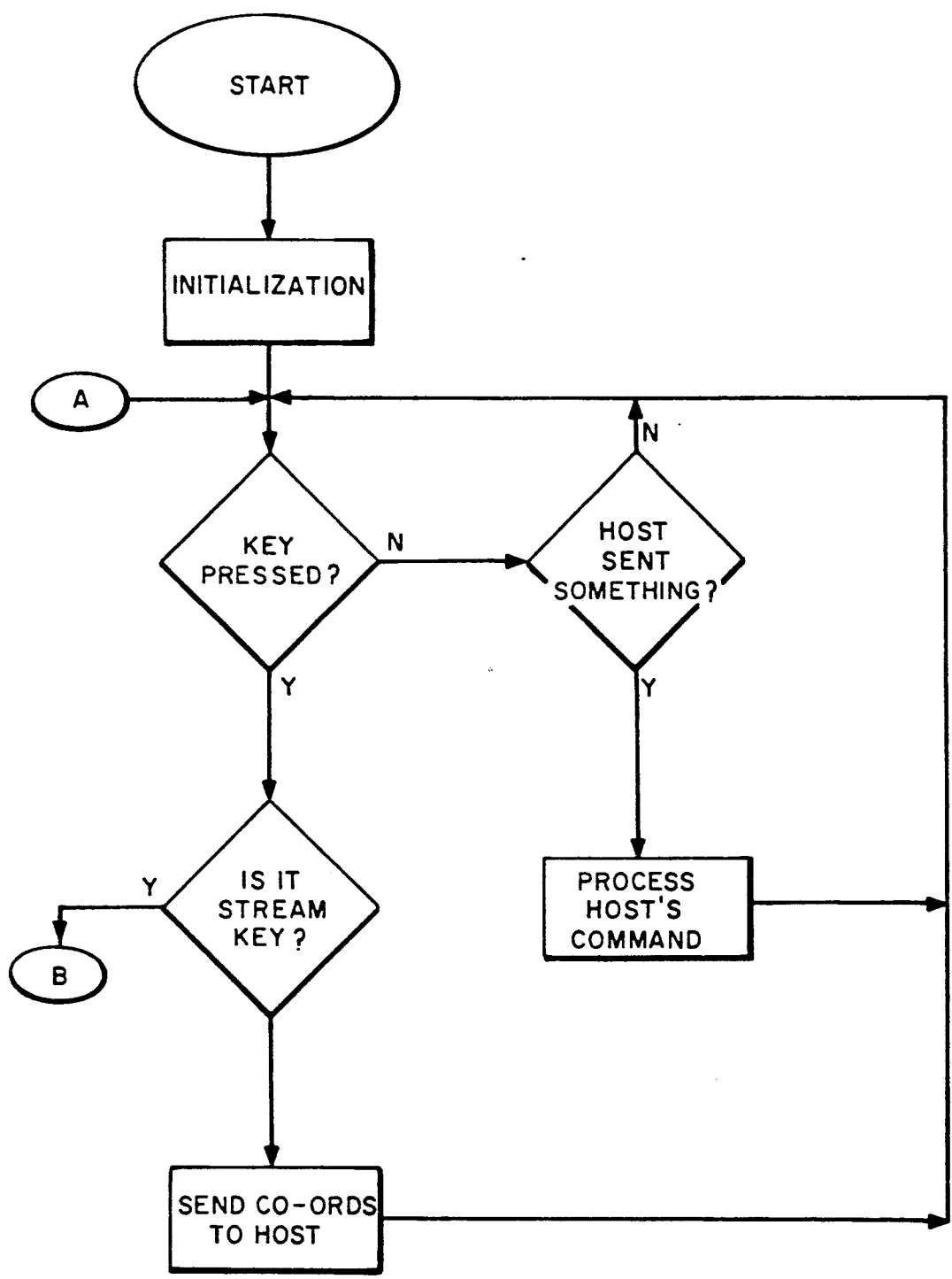
FIGS. 6a, 6b, 6c and 6d together constitute a flow chart indicating the manner of operation of the digitizer software.
Figure 6B:
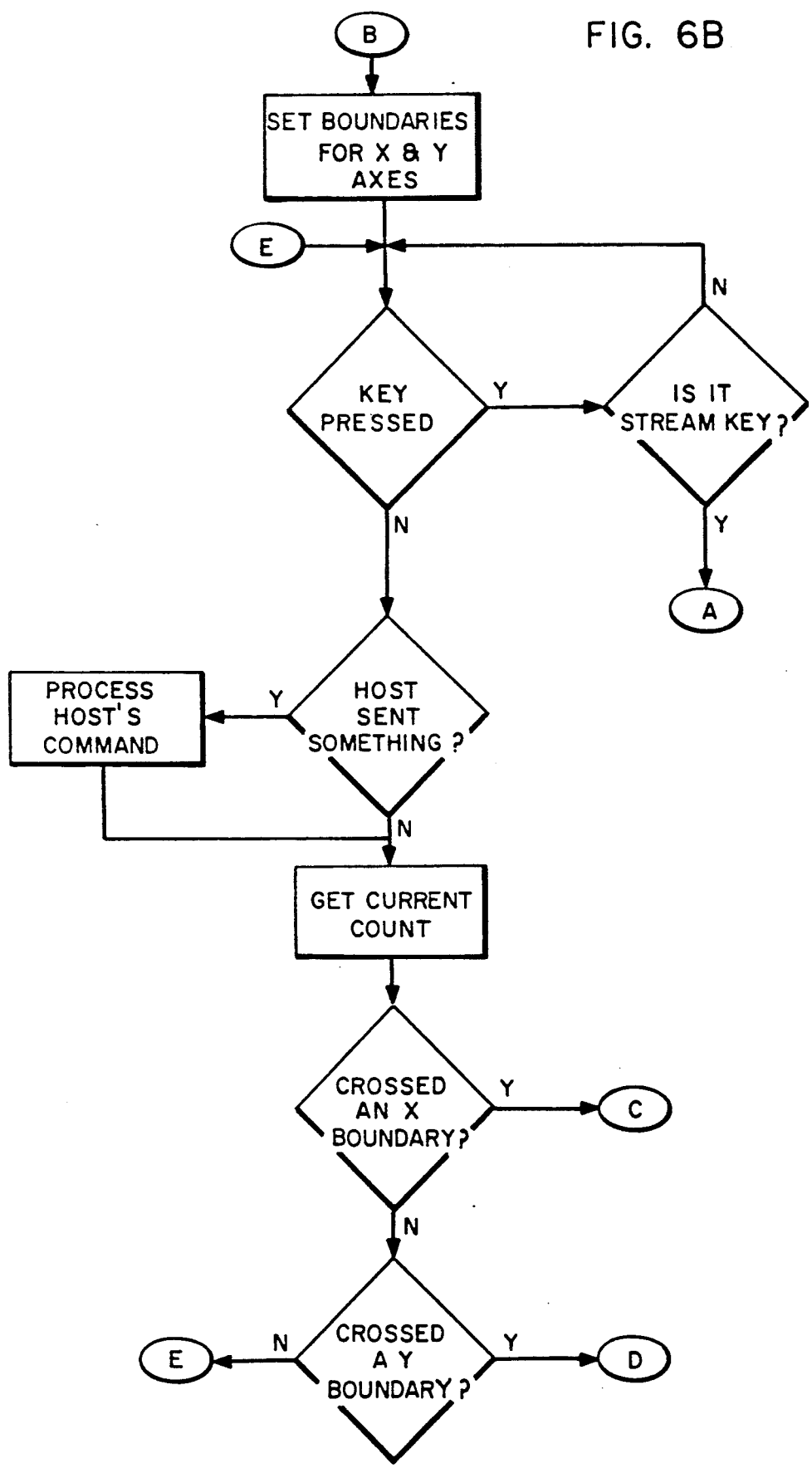
Figure 6C:
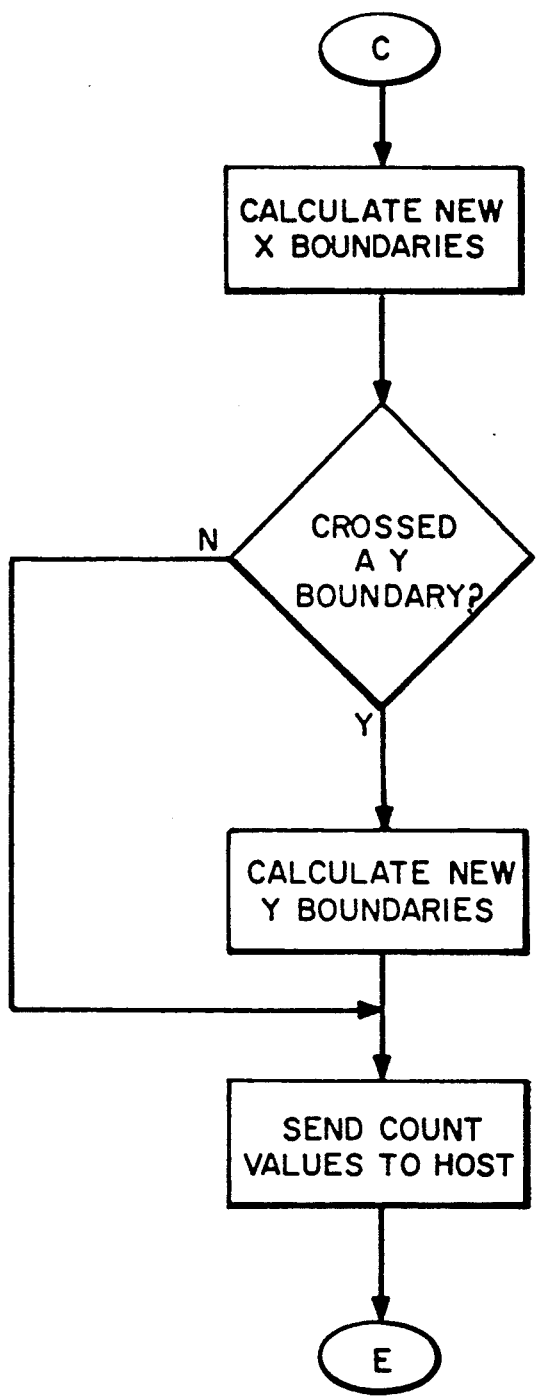
Figure 6D:
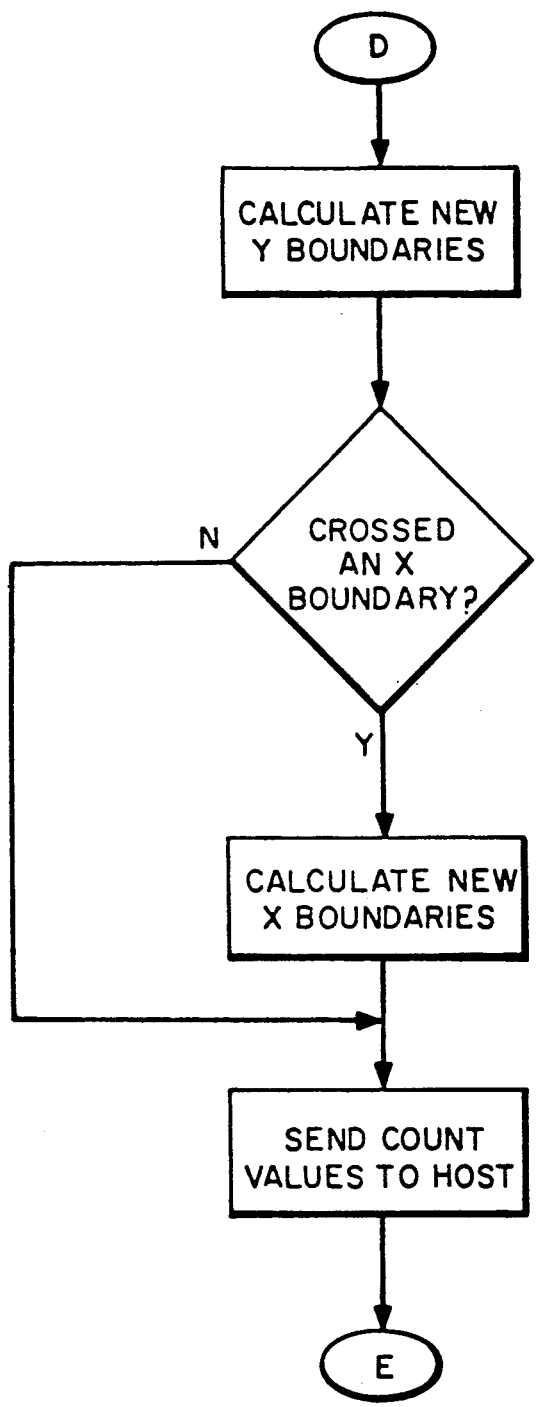

The cursor 52 is shown in more detail in FIGS. 5a, 5b, and 5c. The cursor 52 is mounted on a set of three flanged bearings 54 (see FIGS. 1 and 2), with the upper flange 56 of I-bar 58 resting on the flanges 60 of the bearings 54. Two of the flanged bearings 54 are mounted on the frame 12, while the third is mounted on mount 40, which is itself mounted on the frame 12. The frame 12 is cut back as shown at 20 to receive the cursor 52. Mount 40 is pivotally attached to frame 12 by pivot 57 and a steel spring 59 to provide constant tension on I-bar 58.

I-bar 58 is preferably machined from a ¼" aluminum bar and is fixed by any of several known means on the cursor plate 52. The centre section 64 of the I-bar 58 has superimposed on it, on the side facing the frame 12, a silver and black optical stripe, with predetermined, equally spaced gradations. The fineness of the gradations determines the resolution of the digitizing in the X direction. Preferably, the resolution in the x direction is at least 0.004 inches.

A knob 66, attached to the cursor 52 enables the cursor to be moved conveniently by hand across a two-dimensional paper surface, so that a cross hair 68, superimposed on one end of the cursor 52, may be moved to any chosen position over a wide range in the X direction. A second cross hair (not shown) on the other end of the cursor 52 from the cross-hair 68, may be added to extend the range of the cursor 52 in the X direction. The cross hairs are at a precise known distance apart so that either one can be used when digitizing, effectively doubling the range of the cursor in the x direction.

The digitizer 10 is provided with means for detecting the position of the cursor 52 in the X direction, which, in the preferred embodiment, includes a pair of linear optical encoders 72, each 90 degrees out of phase. The phase difference between the linear optical encoders 72 allows determination of the direction of movement of the cursor 52 to be detected. The linear optical encoders 72 may be, for example, model no. HBCS 1100, readily commercially available.

Signals indicative of the X position of the cursor 52 are provided by the pair of linear optical encoders 72 and fed to integrated circuit 34 (for example, part no. HCTL2016) through amplifier 18. Amplifier 18 is designed to convert the output of the linear encoders to a signal identical to the output format of the HEDS 5000. The integrated circuit 34 keeps track of the position of the cursor 52.

Referring to FIGS. 1, 2 and 3 (particularly FIG. 3), processing means 50 includes electronic circuit board 14 on which is mounted microcomputer unit 30 (for example, Motorola MC 68701 and integrated circuits 32 and 34, keyboard 36 (readily commercially available) and RS 232C interface 38.

Integrated circuit 32 receives amplified signals from the rotary optical encoder 28 and integrated circuit 34 receives amplified signals from the pair of linear optical encoders 72. These signals are fed to the microcomputer unit 30. The operation of the microcomputer unit 30 is described in more detail below. The microcomputer unit 30 is connected to a PC (not shown) through the RS 232C interface 38 (which is readily commercially available). All memory is contained in the microcomputer unit 30, and may be accessed by the PC. Once a data file has been created, the resulting data can readily be processed using any of various systems that are compatible with ASCII format. A printer or monitor (not shown) may be used to display the data in any of various formats.

OPERATION OF THE PREFERRED EMBODIMENT

The microcomputer unit 30 is not concerned with keeping track of each of the rotary optical encoders 28 and the pair of linear optical encoders 72 for each time the digitizer 10 moves. This function is handled by the integrated circuits 32 and 34. These integrated circuits 32 and 34 have built in counters and are directly connected to the encoders 28 and 72 and detect the amount the encoders move in their respective directions. All that is required for the microcomputer unit 30 to determine if the digitizer 10 has moved is simply to query integrated circuits 32 and 34 as to the current count of the encoders 28 and 72.

Upon initialization, the digitizer 10 is constantly looking for a keypress from the port from the keypad 16. As soon as one is detected, the digitizer 10 determines the current count in the X and Y directions (as described immediately above) and sends this information to the connected computer along with the value associated with the key that was pressed. All communications between the digitizer 10 and the PC (the host) is done via standard RS-232C protocol.

This action of hitting a key for every digitized point is referred to as "point mode". The digitizer 10 can also be put into a "streaming mode" whereby it will send coordinates at a specified interval. That is, it can send, for example, the X and Y coordinates every 50 counts on the Y axis. In this case, the digitizer 10 updates the PC host of the position of the digitizer 10 for about every 1/10" movement in the Y direction. The streaming mode may be set for each of the X axis, Y axis, or even for both axes concurrently, and the interval can be set to any number of counts desired. Streaming mode can also be set to send points at a programmable timed interval.

The PC host has a small set of commands that it can send to digitizer 10. These include: zeroing the counters, setting the X streaming interval and setting the Y streaming interval.

The operating software of the digitizer 10 is summarized in the flow charts in FIGS. 6a, 6b, 6c and 6d, and is listed in schedule A appearing at the end of this description. A copy of the programmer's manual which describes the commands to the digitizer 10 is also attached as part of Schedule A. A brief description of the process is as follows:

Following initialization, the digitizer 10 looks to see if any key on the keypad 16 has been pressed. If no key has been pressed, the digitizer 10 looks to see if the PC host has sent any signal. If the answer is no, the digitizer 10 returns to the initialized state in which it looks for a keypress from the keypad 16. If the host has sent something, the digitizer 10 processes the host's command (for example, setting a streaming interval).

In what follows, the X and Y boundaries are the X and Y co-ordinates that correspond to the ends of the streaming intervals on the X and Y axes. Hence the X and Y boundaries and new X and Y boundaries can be calculated internally from the present X and Y boundaries and the streaming interval.

If, after initialization, a key has been pressed on the keypad 16, the digitizer 10 checks to see if the stream key has been pressed. If the stream key has been pressed, then the microcomputer calculates boundaries for the X and Y axis and the digitizer 10 again looks to see if a key has been pressed. If a key has been pressed and it is the stream key, the digitizer 10 returns to the initialization state. If it is not the stream key, it looks for another key press. If there is no key press, the digitizer 10 checks to see if the PC host has sent something, and processes it if it has. In either case, the digitizer 10 then obtains the current count from the integrated circuits 32 and 34 and checks to see whether the counts have crossed the X boundary. If an X boundary has been crossed, the digitizer 10 calculates new X boundaries, and checks to see if a Y boundary has been crossed. If a Y boundary has been crossed, the digitizer 10 calculates new Y boundaries. Once new X and Y boundaries have been calculated, the digitizer 10 sends count values to the PC host, and looks to see if a key has been pressed, beginning the process over again.

If digitizer 10 found initially that an X boundary had not been crossed, then it checks to see if a Y boundary had been crossed. If a Y boundary had not been crossed, then the digitizer 10 looks for a key press again. If a Y boundary has been crossed, the digitizer 10 calculates new Y boundaries, and checks to see if an X boundary has been crossed. If the answer is yes, new X boundaries are calculated. Once this has been done, and in the case of there being no need to recalculate the X boundaries, count values are sent to the host, and the digitizer 10 looks again to see if a key has been pressed on the keypad 16, beginning the process over again.

In this manner, either point by point or automatic digitizing of a trace may be accomplished using a high resolution, wander free, hand held device.

It will be understood that immaterial modifications could be made to the invention described here, and these are intended to be covered by the scope of the claims that follow.

```
         SCHEDULE A to HAND HELD DIGITIZER      INVENTORS: PETER CIAVARELLA &
                                                           BOHDAN M. PETRYHYRYCZ
*****************************************************************************
*            68701 BASED REMOTE RAT
* By Olaf Schroeder (C) Copyright 1989 Digi-Rule Inc.
*****************************************************************************
*****************************************************************************
*            68701 CONDITION CODE REGISTER DEFINITION
*****************************************************************************
CARRY        EQU       $1
OVER         EQU       $2
ZERO         EQU       $4
NEG          EQU       $8
*****************************************************************************
*            INTERNAL REGISTER AREA
*****************************************************************************
P1DDR:       EQU       $00           *PORT 1 DATA DIRECTION REGISTER
P2DDR:       EQU       $01           *PORT 2 DATA DIRECTION REGISTER
P1DR:        EQU       $02           *PORT 1 DATA REGISTER
P2DR:        EQU       $03           *PORT 2 DATA REGISTER
P3DDR:       EQU       $04           *PORT 3 DATA DIRECTION REGISTER
P4DDR:       EQU       $05           *PORT 4 DATA DIRECTION REGISTER
P3DR:        EQU       $06           *PORT 3 DATA REGISTER
P4DR:        EQU       $07           *PORT 4 DATA REGISTER
SR:          EQU       $08           *STATUS REGISTER
TC:          EQU       $08           *TIMER CONTROL
COUNTERH:    EQU       $09           *COUNTER HIGH BYTE
COUNTERL:    EQU       $0A           *COUNTER LOW BYTE
OCH:         EQU       $0B           *OUTPUT COMPARE HIGH BYTE
OCL:         EQU       $0C           *OUTPUT COMPARE LOW BYTE
ICH:         EQU       $0D           *INPUT COMPARE HIGH BYTE
ICL:         EQU       $0E           *INPUT COMPARE LOW BYTE
P3SR:        EQU       $0F           *PORT 3 CONTROL AND STATUS REGISTER
RATECR:      EQU       $10           *RATE CONTROL REGISTER
MODECR:      EQU       $10           *MODE CONTROL REGISTER
TRCR:        EQU       $11           *TRANSMIT/RECEIVE CONTROL REGISTER
TRSR:        EQU       $11           *TRANSMIT/RECEIVE STATUS REGISTER
RXDR:        EQU       $12           *RECEIVE DATA REGISTER
TXDR:        EQU       $13           *TRANSMIT DATA REGISTER
RAMCR:       EQU       $14           *RAM CONTROL REGISTER

*****************************************************************************
*            HARDWARE DEFINITION
*****************************************************************************
*IDLE:       EQU       %10110000     *NORMAL STATE OF RTS, OE, SEL & LATCH
IDLE:        EQU       %01110000     *NORMAL STATE OF LATCH, SEL, OE & RTS
EN_LATCH:    EQU       %11110000     *ENABLE WRITING TO LATCH
EN_KEY:      EQU       %11111111     *HAVE KEYBOARD PORT AS OUTPUTS
DIS_KEY:     EQU       %11110000     *DISABLE KEYBOARD BY PUTTING LINES AS IN
```

```
EN_SEL:         EQU     %00010000       *
EN:             EQU     %01010000
SEL:            EQU     %00110000
RRTS:           EQU     %01100000
RST:            EQU     %00000100       *WRITE TO Dc OF LATCH
LAMPYON:        EQU     %00000010       *WRITE TO Da OF LATCH (1=ON,0=OFF)
LAMPXON:        EQU     %00000001       *WRITE TO Db OF LATCH(Y=STREAMING LED)

XCALVAL:        EQU     '1              *COMMAND FOR X INTERVAL
YCALVAL:        EQU     '2              *COMMAND FOR Y INTERVAL
RESETVAL:       EQU     '0              *COMMAND FOR RESET COUNTERS
ASCIIVAL:       EQU     'A              *COMMAND TO SET TO ASCII MODE
****************************************************************************
                ORG     $80
CURCNT:         RMB     $2
LOWER:          RMB     $2
UPPER:          RMB     $2
XLOWER:         RMB     $2
XUPPER:         RMB     $2
ASCIIFLG:       RMB     $1              *MODE OF OUTPUT - ASCII OR BINARY
CHAR:           RMB     $1
LASTCOM:        RMB     $1
DIGISTRM:       RMB     $1
RDR:            RMB     $1
RDF:            RMB     $1
XTEMP:          RMB     $2
YTEMP:          RMB     $2
LEDS:           RMB     $1
YLOWER:         RMB     $2
YUPPER:         RMB     $2
COUNT:          RMB     $2
YCOUNT:         RMB     $2              *# OF COUNTS FOR Y STREAM
XCOUNT:         RMB     $2              *# OF COUNTS FOR X STREAM
KEYNUM:         RMB     $1              *LAST BYTE TO XMIT
BUFFER:         RMB     $6              *START OF XMIT BUFFER
****************************************************************************
*               HARDWARE INITALIZATION
****************************************************************************
                ORG     $F800

LDS     #$FF            *STACK AT TOP OF INT RAM

LDAA    #$FF            *GET READY FOR COUNTER RESET
                STAA    P1DDR           *SET P14,P15,P16,P17 AS OUTPUT
                LDAA    #EN_LATCH       *RESET COUNTERS
                STAA    P1DR
                ORAA    #RST
                STAA    P1DR
                LDAA    #EN_LATCH
                STAA    P1DR
                LDAA    #IDLE
                STAA    P1DR

LDAA    #$0C            *SELECT EXTERNAL CLOCK
                STAA    MODECR          *RATE AND MODE CONTROL REGISTER

LDAA    #$1A            *ENABLE TRANSMIT AND RECEIVE
                STAA    TRCR            *AND INTERRUPT ON RECEIVE

LDAA    #$00            *SET PORTS 3 & 4 FOR INPUTS
                STAA    P3DDR
                STAA    P4DDR

LDAA    #$2             *SET FOR INPUT CAPTURE ON POSITIVE-EDGE
                STAA    SR

LDAA    #00             *INITIALIZE LED VARIABLE
                STAA    LEDS
                STAA    RDF
                STAA    DIGISTRM
                STAA    LASTCOM
                STAA    ASCIIFLG
                LDD     #10
                STD     YCOUNT
                STD     XCOUNT

LDAA    #EN_LATCH       *ALLOW MODIFICATION OF LATCH
                STAA    P1DR
```

```
                ANDA    #IDLE+$F        *LATCH IT
                STAA    P1DR

LDX     #STR1
                JSR     PUTS
*               INC     ASCIIFLG
                CLI
*               JMP     BITPAD
**********************************************************************
*               START OF RUNNING PROGRAM
**********************************************************************

RUNLOOP:        LDAA    #IDLE+$F        *CHECK FOR +ANY+ PRESS
                STAA    P1DR
                LDAA    P3DR            *READ KEYBOARD
                ANDA    #$F0            *Z WILL BE SET IF NO KEY PRESSED
                BEQ     RUN1
                JSR     GETKEY
                BCC     RUN1
                JSR     GETCOUNT
                LDAB    KEYNUM
                CMPB    #04             *IS IT STREAM
                BEQ     STREAM
                CMPB    #05             *IS IT DIGITIZE & STREAM?
                BEQ     STREAM2
SKIP1:          JSR     DUMPIT          *PROCEED WITH POINT AND KEY
                JSR     GOAWAY
RUN1:           LDAA    RDF             *CHECK FOR COMMAND FROM COMPUTER
                BPL     RUNLOOP         *NOTHING, CONTINUE
                JSR     PROCESS         *OTHERWISE PROCESS
                BRA     RUNLOOP

**********************************************************************
*               STREAMING MODE(s)
**********************************************************************

STREAM:         JSR     GOAWAY
                JSR     DUMPIT
                BRA     S0
STREAM2:        JSR     DUMPIT
                LDAA    #$FF
                STAA    DIGISTRM
S0:             LDAA    #LAMPYON        *PUT ON STREAMING LED
                STAA    LEDS
                ORAA    #EN_LATCH       *ALLOW MODIFICATION OF LATCH
                STAA    P1DR
                ANDA    #IDLE+$F        *LATCH IT
                STAA    P1DR
                LDX     YCOUNT
                CPX     #1              *STREAMING INTERVAL OF ONE?
                BNE     NORSTR
                LDX     XCOUNT
                CPX     #1
                BNE     NORSTR
**********************************************************************
* OPTIMUM CODE FOR STREAMING INTERVAL OF ONE FOR BOTH COUNTS
**********************************************************************
                LDX     BUFFER          *INITAILIZE LAST COUNT VARIABLE
                STX     XLOWER
                LDX     BUFFER+2
                STX     YLOWER
OPTSTR:         JSR     GETCOUNT        *GET NEW COUNT
                LDX     BUFFER
                CPX     XLOWER          *SAME?
                BEQ     OPTSTR1
                STX     XLOWER
                JSR     DUMPIT
                BRA     OPTSTR
OPTSTR1:        LDX     BUFFER+2
                CPX     YLOWER          *SAME?
                BEQ     OPTSTR          *
                STX     YLOWER          *CHANGED, UPDATE VARIABLE
                JSR     DUMPIT
                BRA     OPTSTR

*STRATEGIC PLACEMENT OF ROUTINE SO IT CAN BE REACHED BY BRANCH
QUITSTR2:       CLR     LEDS            *EXIT DIGI-STREAM MODE
                CLR     DIGISTRM
```

```
                LDAA    #EN_LATCH
                STAA    P1DR
                ANDA    #IDLE+$F
                STAA    P1DR
                JSR     GOAWAY
                JMP     RUNLOOP         *RETURN TO POINT MODE

***********************************************************************
* STREAMING INTERVAL OF NON-ONE VALUE
***********************************************************************
NORSTR:         LDD     BUFFER+2        *SET BOUNDRIES
                SUBD    YCOUNT
                STD     YLOWER
                LDD     BUFFER+2
                ADDD    YCOUNT
                STD     YUPPER
                LDD     BUFFER
                SUBD    XCOUNT
                STD     XLOWER
                LDD     BUFFER
                ADDD    XCOUNT
                STD     XUPPER

CHKBOTH:        LDAA    #IDLE+$F        *TEST FOR +ANY+ KEY
                STAA    P1DR
                LDAA    P3DR            *READ KEYBOARD
                ANDA    #$F0            *SET Z FLAG
                BEQ     NOKEY
                JSR     GETKEY          *SOME KEY IS HIT, WHAT IS IT?
                BCC     NOKEY           *IS IT NOW GONE?
                CMPB    #4
                BEQ     QUITSTRM
NOKEY:          LDAA    DIGISTRM
                BNE     QUITSTR2
                LDAA    RDF             *CHECK FOR COMMAND FROM COMPUTER
                BPL     CHK1            *NOTHING, CONTINUE
                JSR     PROCESS         *OTHERWISE PROCESS
CHK1:           JSR     GETCOUNT
                LDX     YCOUNT
                BEQ     CHKX
                STX     COUNT
                JSR     CHKYBND
                BVC     CHKX            *ANY Y BOUNDRIES CROSSED?
                LDX     YLOWER          *YES, SET UP VARIABLES TO BE PROCESSED
                STX     LOWER
                LDX     YUPPER
                STX     UPPER
                LDX     BUFFER+2
                STX     CURCNT
                JSR     PROBOUND
                LDX     LOWER           *SAVE NEW BOUNDRY VALUES
                STX     YLOWER
                LDX     UPPER
                STX     YUPPER

LDX     XCOUNT          *STREAMING ON X AS WELL?
                BEQ     GOTY            *NO, GO DUMP - Y CROSSED A BOUNDRY
                STX     COUNT
                JSR     CHKXBND
                BVC     GOTY            *ANY X BOUNDRIES CROSSED?
                LDX     XLOWER          *YES, SET UP VARIABLES TO BE PROCESSED
                STX     LOWER
                LDX     XUPPER
                STX     UPPER
                LDX     BUFFER
                STX     CURCNT
                JSR     PROBOUND
                LDX     LOWER           *SAVE NEW BOUNDRY VALUES
                STX     XLOWER
                LDX     UPPER
                STX     XUPPER
GOTY:           JSR     DUMPIT
                BRA     CHKBOTH

CHKX:           LDX     XCOUNT          *NOT STREAMING ON Y, STREAMING ON X?
                BEQ     CHKBOTH         *NO, KEEP CHECKING
                STX     COUNT
                JSR     CHKXBND
```

```
                BVC     CHKBOTH         *DID X CROSS A BOUNDRY?
                LDX     XLOWER          *YES, SET UP VARIABLES TO BE PROCESSED
                STX     LOWER
                LDX     XUPPER
                STX     UPPER
                LDX     BUFFER
                STX     CURCNT
                JSR     PROBOUND
                LDX     LOWER           *SAVE NEW BOUNDRY VALUES
                STX     XLOWER
                LDX     UPPER
                STX     XUPPER
                JSR     DUMPIT
                JMP     CHKBOTH

QUITSTRM:       CLR     LEDS
                JSR     DUMPIT          *STOP STREAM CO-ORDINATES TO PC
                JSR     GOAWAY
                JMP     RUNLOOP         *RETURN TO POINT MODE

*************************************************************************
* CHECKS IF CURRENT Y HAS PASSED A BOUNDRY, AND IF SO COMPUTE WHICH FUNCTION
* SHOULD BE CALLED TO PROCESS THE BOUNDRY.
*
* RETURNS OVERFLOW SET IF BOUNDRY CROSSED
* IF CROSSED, CARRY DETERMINES DIRECTION.
*       IF CARRY SET, CROSSED LOWER
*       IF CARRY CLEAR, CROSSED UPPER
* IF ZERO BIT IS CLEAR, THEN TREAT BOUNDRIES AS UNSIGNED
* IF ZERO IS SET, THEN TREAT BOUNDRIES AS SIGNED
*************************************************************************
CHKYBND:        LDX     YUPPER          *ARE THE BOUNDRIES STRADDLING ZERO?
                CPX     YLOWER
                BLO     YTST2

LDX     BUFFER+2        *HAVE WE CROSSED A BOUNDRY?
                CPX     YLOWER          *LOWER?
                BLS     SUBY1
                CPX     YUPPER          *UPPER?
                BHS     SUBY2
                CLV
                RTS
SUBY1:          LDD     YLOWER          *REALLY CROSS LOWER?
                SUBD    BUFFER+2        *IE, DIFFERENCE < 32K
                BPL     SUBY3           *YUP
                LDAA    #OVER+ZERO      *NO, GO OTHER WAY
                TAP
                RTS
SUBY3:          LDAA    #OVER+CARRY
                TAP
                RTS
SUBY2:          LDD     BUFFER+2        *REALLY CROSS UPPER?
                SUBD    YLOWER          *IE, DIFFERENCE < 32K
                BPL     SUBY4           *YUP
                LDAA    #OVER+ZERO+CARRY *NO, GO OTHER WAY
                TAP
                RTS
SUBY4:          LDAA    #OVER
                TAP
                RTS

YTST2:          LDX     BUFFER+2        *BOUNDRIES ARE STRADDLING ZERO..
                CPX     YLOWER          *HAVE WE CROSSED THEM?
                BLE     SETY1           *LOWER?
                CPX     YUPPER
                BGE     SETY2           *UPPER?
                CLV
                RTS
SETY1:          LDAA    #OVER+CARRY+ZERO
                TAP
                RTS
SETY2:          LDAA    #OVER+ZERO
                TAP
                RTS

*************************************************************************
* CHECKS IF CURRENT X HAS PASSED A BOUNDRY, AND IF SO COMPUTE WHICH FUNCTION
```

* SHOULD BE CALLED TO PROCESS THE BOUNDRY.
*
* RETURNS OVERFLOW SET IF BOUNDRY CROSSED
* IF CROSSED, CARRY DETERMINES DIRECTION.
*       IF CARRY SET, CROSSED LOWER
*       IF CARRY CLEAR, CROSSED UPPER
* IF ZERO BIT IS CLEAR, THEN TREAT BOUNDRIES AS UNSIGNED
* IF ZERO IS SET, THEN TREAT BOUNDRIES AS SIGNED
***********************************************************************
```
CHKXBND:    LDX     XUPPER          *ARE THE BOUNDRIES STRADDLING ZERO?
            CPX     XLOWER
            BLO     XTST2

LDX     BUFFER          *HAVE WE CROSSED A BOUNDRY?
            CPX     XLOWER          *LOWER?
            BLS     SUBX1
            CPX     XUPPER          *UPPER?
            BHS     SUBX2
            CLV
            RTS
SUBX1:      LDD     XLOWER          *REALLY CROSS LOWER?
            SUBD    BUFFER          *IE, DIFFERENCE < 32K
            BPL     SUBX3           *YUP
            LDAA    #OVER+ZERO      *NO, GO OTHER WAY
            TAP
            RTS
SUBX3:      LDAA    #OVER+CARRY
            TAP
            RTS
SUBX2:      LDD     BUFFER          *REALLY CROSS UPPER?
            SUBD    XLOWER          *IE, DIFFERENCE < 32K
            BPL     SUBX4           *YUP
            LDAA    #OVER+ZERO+CARRY *NO, GO OTHER WAY
            TAP
            RTS
SUBX4:      LDAA    #OVER
            TAP
            RTS

XTST2:      LDX     BUFFER          *BOUNDRIES ARE STRADDLING ZERO..
            CPX     XLOWER          *HAVE WE CROSSED THEM?
            BLE     SETX1           *LOWER?
            CPX     XUPPER
            BGE     SETX2           *UPPER?
            CLV
            RTS
SETX1:      LDAA    #OVER+CARRY+ZERO
            TAP
            RTS
SETX2:      LDAA    #OVER+ZERO
            TAP
            RTS
```
***********************************************************************
* PROCESS BOUNDRIES DETERMINES WHICH ROUTINE TO CALL DEPENDING ON VALUES
* OF Z & C FLAGS THAT WERE SET BY CHKBND.
***********************************************************************
```
PROBOUND:   BEQ     PRO1            *SIGNED BOUNDRIES?
            BCC     PRO2            *NO, CROSSED UPPER?
            BRA     CROSSL          *NO, MUST HAVE CROSSED LOWER
PRO2:       BRA     CROSSU
PRO1:       BCC     PRO3            *CROSSED UPPER?
            BRA     CRSZL           *NO, MUST HAVE CROSSED LOWER
PRO3:       JMP     CRSZU

CROSSL:     LDD     LOWER           *SET UP TEMPORARY VARIABLE
            STD     XTEMP
L1:         LDD     XTEMP           *GET CURRENT VARIABLE
            SUBD    COUNT           *MOVE DOWN ONE INTERVAL
            STD     XTEMP
            BCS     L2
            LDX     XTEMP
            CPX     CURCNT          *HAVE WE PASSED THE RAT'S COUNTER?
            BHI     L1              *NO, DO IT AGAIN
            BEQ     L3              *YES, HIT IT EXACTLY?
            STX     LOWER           *SAVE NEW LOWER BOUNDRY
            LDD     LOWER
            ADDD    COUNT
```

```
              ADDD    COUNT
              STD     UPPER
              RTS

L2:           LDX     XTEMP
              CPX     CURCNT          *HAVE WE PASSED THE RAT'S COUNTER?
              BGE     L1              *NO, DO IT AGAIN
              STX     LOWER           *SAVE NEW LOWER BOUNDRY
              LDD     LOWER
              ADDD    COUNT
              ADDD    COUNT
              STD     UPPER
              RTS

L3:           STX     LOWER           *COUNTER HIT A BOUNDRY EXACTLY
              LDD     LOWER
              ADDD    COUNT
              STD     UPPER
              LDD     LOWER
              SUBD    COUNT
              STD     LOWER
              RTS

CROSSU:       LDD     UPPER           *GET THE UPPER BOUNDRY
              STD     XTEMP
U1:           LDD     XTEMP
              ADDD    COUNT           *MOVE UP ONE INTERVAL
              STD     XTEMP
              BCS     U2
              LDX     XTEMP
              CPX     CURCNT          *HAVE WE CROSSED THE BOUNDRY?
              BLO     U1              *NO, DO IT AGAIN
              BEQ     U3              *YES, HIT IT EXACTLY?
              STX     UPPER           *SAVE NEW UPPER BOUNDRY
              LDD     UPPER           *CALCUALTE NEW LOWER BOUNDRY
              SUBD    COUNT
              SUBD    COUNT
              STD     LOWER
              RTS

U2:           LDX     XTEMP
              CPX     CURCNT          *HAVE WE CROSSED THE BOUNDRY?
              BLE     U1              *NO, DO IT AGAIN
              STX     UPPER           *SAVE NEW UPPER BOUNDRY
              LDD     UPPER           *CALCUALTE NEW LOWER BOUNDRY
              SUBD    COUNT
              SUBD    COUNT
              RTS

U3:           STX     UPPER           *COUNTER HIT A BOUNDRY EXACTLY
              LDD     UPPER
              SUBD    COUNT
              STD     LOWER
              LDD     UPPER
              ADDD    COUNT
              STD     UPPER
              RTS

CRSZL:        LDD     LOWER           *SET UP TEMPORARY VARIABLE
              STD     XTEMP
ZL1:          LDD     XTEMP           *GET CURRENT VARIABLE
              SUBD    COUNT           *MOVE DOWN ONE INTERVAL
              STD     XTEMP
              LDX     XTEMP
              CPX     CURCNT          *HAVE WE PASSED THE RAT'S COUNTER?
              BGT     ZL1             *NO, DO IT AGAIN
              BEQ     L3              *YES, HIT IT EXACTLY?
              STX     LOWER           *SAVE NEW LOWER BOUNDRY
              LDD     LOWER
              ADDD    COUNT
              ADDD    COUNT
              STD     UPPER
              RTS

CRSZU:        LDD     UPPER           *GET THE UPPER BOUNDRY
              STD     XTEMP
ZU1:          LDD     XTEMP
              ADDD    COUNT           *MOVE UP ONE INTERVAL
```

```
                STD     XTEMP
                LDX     XTEMP
                CPX     CURCNT      *HAVE WE CROSSED THE BOUNDRY?
                BLT     ZU1         *NO, DO IT AGAIN
                BEQ     U3          *YES, HIT IT EXACTLY?
                STX     UPPER       *SAVE NEW UPPER BOUNDRY
                LDD     UPPER       *CALCUALTE NEW LOWER BOUNDRY
                SUBD    COUNT
                SUBD    COUNT
                STD     LOWER
                RTS

*****************************************************************************
*BIT PAD ONE EMULATION
*****************************************************************************
BITPAD:         JSR     GETCOUNT
                LDX     BUFFER
                STX     XLOWER
                LDX     BUFFER+2
                STX     YLOWER
B0:             JSR     GETCOUNT
                LDAA    #IDLE+$F    *CHECK FOR +ANY+ PRESS
                STAA    P1DR
                LDAA    P3DR        *READ KEYBOARD
                ANDA    #$F0        *Z WILL BE SET IF NO KEY PRESSED
                BEQ     B01
                JSR     GETKEY
                BCC     B01
                LDAA    KEYNUM
                CMPA    #3
                BEQ     SETORG
                ANDA    #$3
                BEQ     LBUT
                CMPA    #1
                BEQ     MBUT
                CMPA    #2
                BEQ     RBUT
                BRA     B01

SETORG:         JSR     CTRESET
                LDX     #0
                STX     XLOWER
                STX     YLOWER
                BRA     B09

LBUT:           LDAA    #$41
                BRA     B08
MBUT:           LDAA    #$48
                BRA     B08
RBUT:           LDAA    #$44
B08:            LDX     BUFFER
                STX     XLOWER
                LDX     BUFFER+2
                STX     YLOWER
                BRA     B10

B01:            LDX     BUFFER
                CPX     XLOWER
                BNE     B1
                LDX     BUFFER+2
                CPX     YLOWER
                BEQ     B0
B1:             LDX     BUFFER
                STX     XLOWER
                LDX     BUFFER+2
                STX     YLOWER
B09:            LDAA    #$40        *BYTE 1 NO KEY PRESS
B10:            STAA    BUFFER
                LDAA    XLOWER+1    *LOW BYTE OF X
                ANDA    #$3F
                STAA    BUFFER+1    *BYTE 2
                LDD     XLOWER
                ASLD
                ASLD
                ANDA    #$3F
                STAA    BUFFER+2    *BYTE 3

LDAA    YLOWER+1    *LOW BYTE OF Y
```

```
                    ANDA    #$3F
                    STAA    BUFFER+3        *BYTE 4
                    LDD     YLOWER
                    ASLD
                    ASLD
                    ANDA    #$3F
                    STAA    BUFFER+4        *BYTE 5
                    CLR     BUFFER+5

LDX     #BUFFER
B2:                 LDAA    ,X
                    BEQ     B3
                    JSR     CHAROUT3
                    INX
                    BRA     B2
B3:                 JMP     B0
```

```
****************************************************************************
* DUMPIT: DUMP THE CONTENTS OF THE COUNTER BUFFER TO THE SERIAL PORT
*
* RETURNS: NOTHING
*
* MODIFIES:    A,B
****************************************************************************
DUMPIT:             LDAA    #EN_LATCH       *ALLOW MODIFICATION OF LATCH
                    ORAA    #LAMPXON        *GET "PACKET BEING SENT" LED
                    ORAA    LEDS            *IN CASE STREAMING LED IS ON
                    STAA    P1DR
                    ANDA    #IDLE+$F        *LATCH IT
                    STAA    P1DR
                    LDAA    ASCIIFLG        *SHOULD WE SEND BINARY OR ASCII?
                    BNE     ASCIIDMP
                    LDAA    BUFFER+1        *REVERSE ORDER FOR 8088
                    JSR     CHAROUT         *
                    LDAA    BUFFER          *A/A
                    JSR     CHAROUT         *A/A
                    LDAA    BUFFER+3        *A/A
                    JSR     CHAROUT         *A/A
                    LDAA    BUFFER+2        *A/A
                    JSR     CHAROUT         *A/A
                    LDAA    KEYNUM          *GET KEY PRESS
                    JSR     CHAROUT         *A/A
ENDDUMP:            LDAA    #EN_LATCH       *TURN OFF "PACKET BEING SENT" LED
                    ORAA    LEDS
                    STAA    P1DR
                    ANDA    #IDLE+$F
                    STAA    P1DR
                    RTS

PRINT:              LDX     YLOWER
                    STX     BUFFER
                    LDX     YUPPER
                    STX     BUFFER+2
                    JSR     ASCIIDMP
                    RTS
```

```
****************************************************************************
* ASCIIDMP: DUMPS (TO THE SERAIL PORT) THE COUNTER BUFFER AS ASCII CHARACTERS
*
* RETURNS: NOTHING
*
* MODIFIES:    A,B,X
****************************************************************************
ASCIIDMP:           LDX     BUFFER          *DUMP X
                    JSR     ASCIT
                    LDAA    #',             *COMMA SEPARATOR
                    JSR     CHAROUT2
                    LDX     BUFFER+2        *DUMP Y
                    JSR     ASCIT
                    LDAA    #',             *COMMA SEPARATOR
                    JSR     CHAROUT2
                    LDAB    KEYNUM          *DUMP KEYPRESS
                    CLRA                    * (SINCE IT'S ONLY 2 DIGITS)
                    STD     XTEMP           * (DON'T USE ASCIT SUBROUTINE)
                    LDX     #10
                    JSR     CONV
                    LDAA    XTEMP+1
                    ADDA    #'0
                    JSR     CHAROUT2
```

```
                    LDAA      #13
                    JSR       CHAROUT2        *THEN A <CR><LF>
                    LDAA      #10
                    JSR       CHAROUT2
                    BRA       ENDDUMP

ASCIT:              STX       XTEMP
                    LDX       #10000          *COUNT THE NUMBER OF 10,000's
                    JSR       CONV
                    LDX       #1000           *COUNT THE NUMBER OF 1,000's
                    JSR       CONV
                    LDX       #100            *COUNT THE NUMBER OF 100's
                    JSR       CONV
                    LDX       #10             *COUNT THE NUMBER OF 10's
                    JSR       CONV
                    LDAA      XTEMP+1         *DUMP LAST DIGIT
                    ADDA      #'0
                    JSR       CHAROUT2
                    RTS

CONV:               STX       YTEMP           *SUCCESSIVELY SUBTRACT TO COUNT
                    CLR       CHAR            *HOW MANY OF X IS IN XTEMP
                    LDD       XTEMP
CONV1:              INC       CHAR
                    SUBD      YTEMP
                    BCC       CONV1
                    ADDD      YTEMP
                    STD       XTEMP
                    LDAA      CHAR
                    ADDA      #47             *CONVERT TO ASCII
                    JSR       CHAROUT2
                    RTS

* SEND A NULL TERMINATED STRING OUT TO THE SERIAL PORT
PUTS:               LDAA      ,X
                    BEQ       PUT1
                    JSR       CHAROUT2
                    INX
                    BRA       PUTS
PUT1:               RTS

****************************************************************************
* CHAROUT: DUMP THE BYTE IN A TO THE SERIAL PORT WITH HANDSHAKING
*
* RETURNS: NOTHING
*
* MODIFIES:     B
****************************************************************************
CHAROUT:            LDAB      TRSR            *IS THE TRANSMIT BUFFER EMPTY?
                    BITB      #%00100000      *CHECK FLAG
                    BEQ       CHAROUT
                    LDAB      TRCR            *CLEAR IT ONCE IT IS SET
ICWAIT:             LDAB      SR              *IS THE INPUT CAPTURE FLAG SET?
                    BPL       ICWAIT          *      IE. COMPUTER RESPONDED
                    LDAB      ICH             *NOW CLEAR THE FLAG ONCE SET
                    STAA      TXDR            *SEND CHARACTER DOWN LINE
                    RTS

****************************************************************************
* CHAROUT2: DUMP THE BYTE IN A TO THE SERIAL PORT WITHOUT HANDSHAKING
*
* RETURNS: NOTHING
*
* MODIFIES:     B
****************************************************************************
CHAROUT2:           LDAB      TRSR            *IS THE TRANSMIT BUFFER EMPTY?
                    BITB      #%00100000      *CHECK FLAG
                    BEQ       CHAROUT2
                    LDAB      TRCR            *CLEAR IT ONCE IT IS SET
                    STAA      TXDR            *SEND CHARACTER DOWN LINE
                    RTS

****************************************************************************
* CHAROUT3: DUMP THE BYTE IN A TO THE SERIAL PORT WITHOUT HANDSHAKING
*           WITH PARITY
*
* RETURNS: NOTHING
*
```

```
* MODIFIES:       A,B
***************************************************************************
CHAROUT3:         LDAB      TRSR              *IS THE TRANSMIT BUFFER EMPTY?
                  BITB      #%00100000        *CHECK FLAG
                  BEQ       CHAROUT2
                  LDAB      TRCR              *CLEAR IT ONCE IT IS SET
                  STAA      CHAR
                  BSR       PARITY
                  STAA      TXDR              *SEND CHARACTER DOWN LINE
                  RTS

*CALCULATES EVEN PARITY
PARITY:           CLR       COUNT
                  LDAA      CHAR
                  LDAB      #7
PAR1:             LSRA
                  BCC       PAR2
                  INC       COUNT
PAR2:             DECB
                  BNE       PAR1
                  LDAA      COUNT
                  ANDA      #1
                  CLC
                  RORA                        *PUT BIT 0 INTO BIT 7
                  RORA
                  ORAA      CHAR
                  RTS

***************************************************************************
* GETKEY: DETERMINES EACH KEY IS PRESSED
*
* RETURNS: CARRY SET IF KEY WAS PRESSED & KEY NUMBER WILL BE IN KEYNUM AND B
*          CARRY CLEAR IF NO KEY WAS PRESSED
*          KEY WILL BE IN KEYNUM IF A KEY IS PRESSED
*
* MODIFIES:       A,B,X
***************************************************************************
GETKEY:           CLR       COUNT             *INITAILIZE VARIABLES
                  LDAA      #$01
LOOP:             ORAA      #IDLE
                  STAA      P1DR
                  LDAB      P3DR
                  ANDB      #$F0              *STRIP LOWER NIBBLE
                  BEQ       INCR
                  LDX       #TABLE
                  ASRB
                  ASRB
                  ASRB
                  ASRB
                  ABX
                  LDAB      0,X
                  BMI       INCR
                  ADDB      COUNT
                  STAB      KEYNUM
                  SEC
                  RTS

INCR:             INC       COUNT
                  ASLA
                  ANDA      #$0F
                  TSTA
                  BNE       LOOP
                  CLC
                  RTS

***************************************************************************
* GOAWAY: WAIT FOR KEYBOARD TO BE CLEAR OF ANY KEYS
*
* RETURNS: NOTHING
*
* MODIFIES:       A,B
***************************************************************************
GOAWAY:           LDAA      #02               *EXTRA DEBOUNCE
AWAYLOP:          LDAB      #IDLE+$F          *CHANGE THIS!! FOR LATCH
                  STAB      P1DR
                  LDAB      P3DR              *LOOK AT PORT
                  ANDB      #$F0              *STRIP UPPER BITS
```

```
                BNE     AWAYLOP         *IF KEY DOWN WAIT
                DECA                    *NEXT CHECK
                BNE     AWAYLOP         *MAKE DAMN SURE KEY GONE
                RTS

********************************************************************
* GETCOUNT: GETS THE CURRENT VALUE OF THE 16 BIT COUNTERS
*
* RETURNS: X COUNTER VALUE IN BUFFER & Y IN BUFFER + 2
*
* MODIFIES:     A
********************************************************************
GETCOUNT:       LDAA    #DIS_KEY        *DISABLE KEYBOARD
                STAA    P1DDR
                LDAA    #EN_SEL         *PUT OE & SEL LINES LOW
                STAA    P1DR
                LDAA    P3DR            *READ HIGH X
                STAA    BUFFER
                LDAA    P4DR            *READ HIGH Y
                STAA    BUFFER+2
                LDAA    #EN             *SIGNAL NEXT READ
                STAA    P1DR
                LDAA    P3DR            *READ LOW X
                STAA    BUFFER+1
                LDAA    P4DR            *READ LOW Y
                STAA    BUFFER+3
                LDAA    #IDLE
                STAA    P1DR
                LDAA    #EN_KEY         *ENABLE KEYBOARD
                STAA    P1DDR
                RTS

********************************************************************
* PROCESS: PC HAS SENT SOMETHING, PROCESS WHAT IT SENT
*
* RETURNS: NOTHING
*
* MODIFIES:     A,B
********************************************************************
PROCESS:        LDAA    RDR             *GET CHAR & CLEAR FLAG
                CLR     RDF
                JSR     TOGRTS
                CMPA    #XCALVAL        *IS THERE AN X CALIBRATION COMMING
                BEQ     XCAL
                CMPA    #YCALVAL        *IS THERE A Y CALIBRATION COMMING
                BEQ     YCAL
                CMPA    #RESETVAL       *IS IT A ZERO COUNTERS REQUEST
                BEQ     CTRESET
                CMPA    #ASCIIVAL       *GO TO ASCII MODE?
                BEQ     ASCIIMODE
                CMPA    #BINVAL         *GO TO BINARY MODE?
                BEQ     BINMODE
                CMPA    #PADVAL
                BEQ     PADMODE
                RTS                     *NO VALID COMMAND SO EXIT
PADMODE:        JMP     BITPAD

XCAL:           LDAA    RDF             *WAIT FOR LOW BYTE
                BPL     XCAL
                LDAA    RDR             *GET CHAR & CLEAR FLAG
                STAA    XCOUNT+1
                CLR     RDF
                JSR     TOGRTS
XCAL2:          LDAA    RDF             *WAIT FOR HIGH BYTE
                BPL     XCAL2
                LDAA    RDR             *GET CHAR & CLEAR FLAG
                STAA    XCOUNT
                CLR     RDF
                JSR     TOGRTS
                RTS

YCAL:           LDAA    RDF             *WAIT FOR LOW BYTE
                BPL     YCAL
                LDAA    RDR             *GET CHAR & CLEAR FLAG
                STAA    YCOUNT+1
                CLR     RDF
                JSR     TOGRTS
```

```
YCAL2:      LDAA    RDF             *WAIT FOR HIGH BYTE
            BPL     YCAL2
            LDAA    RDR             *GET CHAR & CLEAR FLAG
            STAA    YCOUNT
            CLR     RDF
            JSR     TOGRTS
            RTS

CTRESET:    LDAA    #EN_LATCH+RST
            ORAA    LEDS
            STAA    P1DR
            LDAA    #EN_LATCH
            ORAA    LEDS
            STAA    P1DR
            LDAA    #IDLE
            ORAA    LEDS            *RESTORE LEDS
            STAA    P1DR
            RTS

ASCIIMODE:  LDAA    #1
            STAA    ASCIIFLG
            RTS

BINMODE:    CLR     ASCIIFLG
            RTS

************************************************************************
* TOGRTS: TOGGLE RTS LINE TO SIGNAL TO PC THAT RAT GOT BYTE
*
* RETURNS: NOTHING
*
* MODIFIES:     B
************************************************************************
TOGRTS:     LDAB    ASCIIFLG
            BNE     NOTOG
            LDAB    #RRTS           *PULL RTS LOW
            STAB    P1DR
            LDAB    #IDLE           *& BACK HI AGAIN TO SIGNAL GOT CHAR
            STAB    P1DR
NOTOG:      RTS

************************************************************************
* IRQ2: AN IRQ2 HAS OCCURED, PROCESS IT
*
* RETURNS: NOTHING
*
* MODIFIES:     EVERYTHING IS PRESERVED (DUE TO BEING AN INTERRUPT)
************************************************************************
IRQ2:       LDAA    TRSR            *WHAT CAUSED THE INTERRUPT?
            BPL     FRAMING         *FRAMING ERROR?
            STAA    RDF             *SET RECEIVED DATA FLAG
            LDAA    RXDR            *GET THE BYTE THAT WAS SENT
            STAA    RDR             *SAVE IT
            LDAB    LASTCOM         *WHAT WAS THE LAST BYTE?
            CMPB    #$FF
            BNE     IRQEND          *AND $FF IS THAT ONE AN $FF TOO?
            CMPA    #$FF
            BEQ     FRAMING         *YES, THEN RESET
IRQEND:     STAA    LASTCOM         *UPDATE LAST BYTE SENT VARIABLE
            RTI
FRAMING:    LDAA    RXDR            *CLEAR RECEIVE FLAG
            JMP     $F800           *RESET

*** KEYBOARD CONVERSION TABLE ****
TABLE:      FCB     $FF,0,4,$FF
            FCB     $8,$FF,$FF,$FF
            FCB     $0C,$FF,$FF,$FF
            FCB     $FF,$FF,$FF,$FF

STR1:       FCB     $0D,$0A
            FCC     'RAT FIRMWARE VERSION 8.0'
            FCB     $0D,$0A,0

ORG     $FFF0
            FDB     IRQ2            *IRQ2 VECTOR FOR RECEIVE INTERRUPT
            ORG     $FFF8
            FCB     $F8,00          *IRQ1 VECTOR
            FCB     $F8,00          *SWI VECTOR
            FCB     $F8,00          *NMI VECTOR
            FCB     $F8,00          *RESET VECTOR
```

RAT PROGRAMMERS MANUAL
==========================

All parameter passing is done using the C language convention - passing by value only & first parameter is pushed on last (conversly, last parameter is pushed on first). All pointers are FAR.

If using QuickBasic, declare all functions using the format:
DECLARE SUB (or FUNCTION) function_name CDECL (SEG variable_name AS INTEGER,...)

Subroutine: install ()
----------------------
This function installs the communications interrupt driver neccesary for high speed data transfer between the computer and the Rat.

Parameters passed: none

Function: setbuf (integer a,b,c)
--------------------------------
This function sets up the buffer that will contain the Rat's packets. Since the Rat can send packets faster than a program may be able to process them, a buffer is neccesary.
The variables passed corespond to segment of the buffer, the offset of the buffer, and the size of the buffer (specified by the number of 5 byte packets) respectively. The maximum size of the buffer is 13,100 packets (one segment, 64K).
    Sample call from BASIC:
        CALL setbuf (segment,offset,size)

Returns: -1 if buffer could not be contained in one segment.
    ie. offset + ( buffersize * 5 ) > 64K Function: zero ()
-----------------
This function zero's the Rat's running counters for the X & Y co-ordinates.

Parameters passed: none
Returns: -1 if unable to zero counters

Function: ycount (integer a)
----------------------------
This function allows you to determine how often the Rat will send a packet to the computer when moving in the y direction. This is also called the Y streaming mode interval.
With a value of one the Rat will send packets every 1/500 of an inch.
To dis-able Y streaming set the interval to zero.

NOTE: the maximum is 65534.
Returns: -1 if unable to set ycount

Function: xcount (integer a)
----------------------------
The same as 'ycount' except for in the x direction.

Subroutine: getpacket (interger a,b,c,d)
----------------------------------------
This subroutine get a packet from the buffer. The packet will be returned in the four variables that are passed to it. The variables corespond to X co-ordinate, Y co-ordinate, keypress, and number of packets remaining in the buffer.
    Sample call from BASIC:
        CALL getpacket (x,y,keypress,remain)

If the buffer has not been intialized the values are undefined.
If the buffer is empty the value for the packets remaining will be -1.

Subroutine: uninstall ()
------------------------
This function stops the interrupt driver from functioning. It is required for this function to be called before exiting your program otherwise a computer crash is likely to occur.

We claim:

1. A digitizer for digitizing a trace on a two dimensional surface, in which the surface is defined by a longitudinal Y direction and a transverse X direction, the digitizer comprising:

a frame freely movable over and unattached to the surface;

means mounted on the frame for restraining the frame to move in the Y direction relative to the frame;

a cursor mounted on the frame and restrained to move in the X direction;

means mounted on the frame for detecting the position of the frame in the Y direction and producing a first signal representative of the Y position of the frame;

means mounted on the frame or cursor for detecting the position of the cursor in the X direction and for producing a second signal representative of the X position of the cursor; and processing means connected to the Y position detection means and the X position detection means for processing the first and second signals.

2. The digitizer of claim 1 in which the processing means comprises:

means electrically connected to the Y position detection means for receiving the first signal;

means electrically connected to the X position detection means for receiving the second signal;

a microcomputer unit connected to each of the first signal receiving means and the second signal receiving means for selectively interrogating the first signal receiving means and the second signal receiving means as to the position of the frame in the Y direction and the position of the cursor in the X direction; and a keypad mounted on the frame and electrically connected to the microcomputer unit.

3. The digitizer of claim 2 in which the microcomputer unit is contained within the frame and the keypad is mounted on top of the frame to be easily accessible by hand.

4. The digitizer of claim in which the Y direction restraining means includes at least one rim having a roughened surface.

5. The digitizer of claim 4 in which the roughened surface is made from diamond grit.

6. The digitizer of claim 1 in which the Y direction restraining means comprises an axle mounted on the frame, a pair of wheels mounted on the axle and constrained to move with each other, each of the wheels having an external gripping surface.

7. The digitizer of claim 6 in which the Y position detection means includes a rotary optical encoder mounted on the frame.

8. The digitizer of claim 1 in which:

the cursor has mounted on it a series of coded stripes; and the X position detection means includes a pair of linear optical encoders mounted on the frame and oriented towards the coded stripe.

* * * * *